United States Patent [19]

May

[11] Patent Number: 4,736,439

[45] Date of Patent: Apr. 5, 1988

[54] IMAGE PREPROCESSING BY MODIFIED MEDIAN FILTER

[75] Inventor: Bruce O. May, Ridgecrest, Calif.

[73] Assignee: The United States of America as represented by the Secretary of the Navy, Washington, D.C.

[21] Appl. No.: 737,606

[22] Filed: May 24, 1985

[51] Int. Cl.[4] ........................... G06K 9/56; G06K 9/40
[52] U.S. Cl. ......................... 382/54; 382/52; 382/27; 382/31; 358/166; 358/167
[58] Field of Search ........................ 382/50, 52, 54, 27; 358/282, 284, 167, 166

[56] References Cited

U.S. PATENT DOCUMENTS

| | | | |
|---|---|---|---|
| 3,597,731 | 8/1971 | Reitboeck | 382/27 |
| 3,748,644 | 7/1973 | Tisdale | 340/149 A |
| 3,794,272 | 2/1974 | Hecker | 244/3.17 |
| 3,805,239 | 4/1974 | Watanabe | 340/146.3 MA |
| 3,993,976 | 11/1976 | Ginsburg | 382/31 |
| 4,303,943 | 12/1981 | May | 358/167 |
| 4,334,244 | 6/1982 | Chan et al. | 358/166 |
| 4,395,698 | 7/1983 | Sternberg et al. | 382/27 |
| 4,396,903 | 8/1983 | Habicht et al. | 382/9 |
| 4,400,729 | 8/1983 | Jones | 358/166 |
| 4,463,375 | 7/1984 | Macouski | 358/167 |
| 4,485,399 | 11/1984 | Schulz et al. | 358/167 |
| 4,597,009 | 6/1986 | Ballmer et al. | 382/52 |
| 4,642,689 | 2/1987 | Demmer | 358/166 |

OTHER PUBLICATIONS

Pratt; *Digital Image Processing*, 1978, pp. 330–333.

Primary Examiner—Leo H. Boudreau
Assistant Examiner—A. Anne Skinner
Attorney, Agent, or Firm—W. C. Townsend; W. Thom Skeer; Stephen J. Church

[57] ABSTRACT

Preprocessing of a noisy image, such as is obtained by a raster scan, by subtracting the median of the pixel values of one or more lines from the medians of predetermined pixel neighborhoods.

2 Claims, 2 Drawing Sheets

Fig. 4

| 4 | 4 | 4 | 3 | 3 | 3 | 2 | 2 | 1 | 1 | 1 | 0 | 0 | 0 |
|---|---|---|---|---|---|---|---|---|---|---|---|---|---|
| 4 | 4 | 4 | 3 | 3 | 3 | 2 | 2 | 9 | 9 | 1 | 1 | 0 | 0 |
| 4 | 4 | 4 | 3 | 3 | 3 | 2 | 2 | 10 | 9 | 5 | 1 | 0 | 0 |
| 4 | 4 | 4 | 4 | 3 | 10 | 10 | 10 | 10 | 9 | 5 | 5 | 1 | 0 |
| 4 | 4 | 4 | 5 | 8 | 11 | 10 | 10 | 10 | 9 | 9 | 9 | 8 | 4 | 0 |
| 6 | 6 | 6 | 6 | 8 | 10 | 10 | 10 | 10 | 9 | 9 | 9 | 8 | 2 | 2 |
| 6 | 6 | 6 | 5 | 5 | 5 | 8 | 4 | 4 | 3 | 3 | 3 | 2 | 2 | 2 |

| 2 | 2 | 2 | 1 | 1 | 1 | 0 | 0 | 0 | 0 | 0 | 0 | 0 | 0 |
|---|---|---|---|---|---|---|---|---|---|---|---|---|---|
| 1 | 1 | 1 | 0 | 0 | 0 | 0 | 0 | 6 | 6 | 0 | 0 | 0 | 0 |
| 1 | 1 | 1 | 0 | 0 | 0 | 0 | 0 | 7 | 6 | 2 | 0 | 0 | 0 |
| 0 | 0 | 0 | 0 | 0 | 6 | 6 | 6 | 6 | 5 | 1 | 1 | 0 | 0 |
| 0 | 0 | 0 | 0 | 0 | 2 | 1 | 1 | 1 | 0 | 0 | 0 | 0 | 0 |
| 0 | 0 | 0 | 0 | 0 | 1 | 1 | 1 | 1 | 0 | 0 | 0 | 0 | 0 |
| 2 | 2 | 2 | 1 | 1 | 1 | 4 | 0 | 0 | 0 | 0 | 0 | 0 | 0 |

| 2 | 2 | 2 | 1 | 1 | 1 | 0 | 0 | 0 | 0 | 0 | 0 | 0 | 0 |
|---|---|---|---|---|---|---|---|---|---|---|---|---|---|
| 1 | 1 | 1 | 0 | 0 | 0 | 0 | 0 | 6 | 6 | 0 | 0 | 0 | 0 |
| 1 | 1 | 1 | 0 | 0 | 0 | 0 | 0 | 7 | 6 | 2 | 0 | 0 | 0 |
| 0 | 0 | 0 | 0 | 0 | 6 | 6 | 6 | 6 | 5 | 1 | 1 | 0 | 0 |
| 1 | 1 | 1 | 2 | 5 | 8 | 7 | 7 | 7 | 6 | 6 | 6 | 5 | 1 | 0 |
| 2 | 2 | 2 | 2 | 4 | 6 | 6 | 6 | 6 | 5 | 5 | 5 | 4 | 0 | 0 |
| 2 | 2 | 2 | 1 | 1 | 1 | 4 | 0 | 0 | 0 | 0 | 0 | 0 | 0 |

(60)

IMAGE PREPROCESSING BY MODIFIED MEDIAN FILTER

BACKGROUND OF THE INVENTION

1. Field of the Invention

This invention pertains to the field of image analysis. More particularly, it pertains to image transformation or pre-recognition processing using adaptive quantization based on a local average.

2. Description of the Prior Art

The digital representation of an image by pixel values dispersed in a matrix is, well known, as are various digital techniques for the removal of noise from the image, "noise" being used in the sense of anything which degrades an ideal image and including high frequency noise, which affects one or a few pixels, and low frequency noise, such as a systemic error which causes a brightness change between opposite sides of an image.

An effective way of correcting an unrepresentative value of one pixel is "median filtration", which is the substitution, for the value of one pixel, of the median of pixel values in a predetermined neighborhood of pixels containing the one pixel. For example, the median value of pixels arranged in a cross or a square centered on the one pixel may be substituted for the value thereof. Such neighborhood median filtration is, however, relatively ineffective for low frequency noise and does not take advantage of lengthy discontinuities, such as the horizon or extended object portions, actually present in an imaged scene.

SUMMARY OF THE INVENTION

The subject invention involves image preprocessing by median filtration in which the median value of one or more rows of pixels of a digitized image represented by a matrix, as might result from a raster scan, is subtracted from the values of individual pixels to filter low and high frequency noise.

It is an object of the subject invention to provide improved median filtration for image processing.

Another object is to provide such improved filtration which is effective with low and with high frequency noise.

Another object is to provide such improved filtration which is fully effective with imaged objects occupying both the majority of an image line or a smaller portion thereof.

Still another object is to provide such improved filtration which is sensitive to lengthy real discontinuities in an imaged scene.

A further object is to provide such improved filtration which is simply and rapidly executed.

BRIEF DESCRIPTION OF THE DRAWING

Other objects, advantages, and novel features of the subject invention will become apparent from the following detailed description thereof when considered with the accompanying drawings in which:

FIGS. 2 through 6 are exemplary matrices which represent images within the system.

DESCRIPTION OF THE PREFERRED EMBODIMENT

Figure 1:
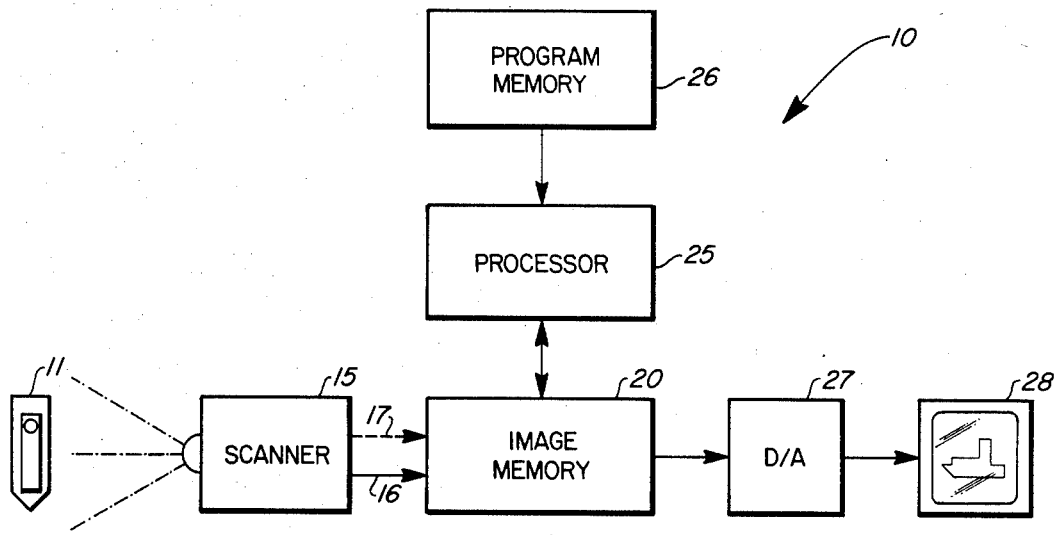
FIG. 1 is a block diagram of a representative imaging system using the subject invention.

In FIG. 1 is shown a representative system, indicated generally by the numeral 10, for imaging a scene including a target object 11 shown in plan view and, typically, disposed against a horizon line, not shown in FIG. 1. System 10 is of any suitable construction providing a digitized image of the scene represented conceptually, as shown in each of the FIGS. 2 through 6, as a matrix having a plurality of parallel row vectors, which extend horizontally in these figures, and having a plurality of parallel column vectors which are orthogonally related to the row vectors. The row and column vectors are commonly referred to, respectively, as rows and columns or, generally, as lines. The components of the vectors are thus the elements, or pixels, of the matrix and have values corresponding individually to the brightness of points in the scene. The pixel values and matrix size shown in FIGS. 2 through 6 are selected for simplicity in exposition and are smaller than those typical in an actual imaging system.

System 10 has a scanner 15 sensitive to radiation, such as infrared radiation from the scene with object 11. Scanner 15 performs a raster scan of the scene and outputs successive digitized pixel values representing the scene on a conductor 16, together with suitable synchronizing signals represented by a dash line 17, to a digital image memory 20 for storage therein in a well known manner as a matrix, such as that of FIG. 2.

System 10 has a processor 25 which is controlled by a program stored in a program memory 26 and is adapted to access memory 20 to practice, in accordance with a program, image preprocessing using the median filtration of the subject invention. It is believed that a suitable such program would, in light of the present description, be readily apparent to one skilled in the art of digital image preprocessing. After such preprocessing and any other desired preprocessing, the digitized image, typically, is presented through a digital to analog converter 27 for viewing by a CRT 29. The image as stored in memory 20 may be utilized in other ways, for example, digital processing for correlation with images of known objects.

Figure 2:
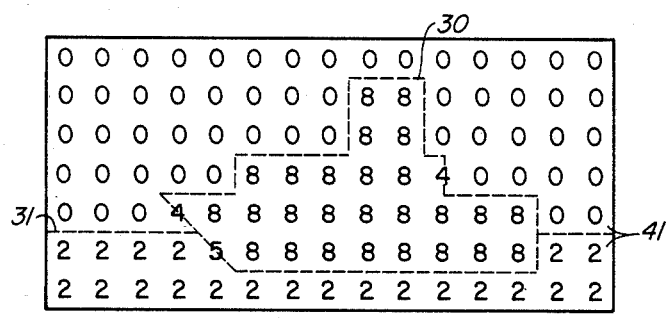

FIG. 2 is a 7 by 15 matrix whose element values are idealized as might be obtained if there were no noise in system 10 or in the scene scanned thereby. FIG. 2 has an image 30 of object 11, which is assumed to have a uniform brightness equivalent to a pixel value of 8, while above and below a horizon line 31 there exist uniform backgrounds equivalent, respectively, to pixel values of 0 and 2.

Figure 3:
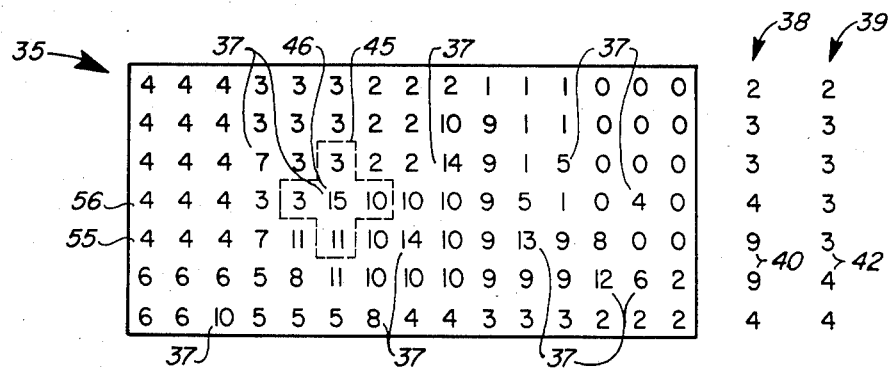

FIG. 3 shows a matrix 35 having values which might be initially stored in memory 20 by scanner 15 instead of the idealized values of the matrix of FIG. 2. In matrix 35 the values of random pixels 37 have been increased by 4 units over the values of the corresponding pixels in FIG. 2, as might occur with high frequency noise. The values of most of the pixels in matrix 30 have also been increased progressively from right to left over the values of the corresponding pixels in FIG. 2, as might occur with low frequency noise. The nature of this increase and the specific values thereof will be apparent by comparison of the values of the upper rows of the matrices in FIGS. 2 and 3. It is assumed that the increases in pixel values due to low and to high frequency noise are addictive. Due to these increases, it is apparent that the values of the pixels of matrix 35, in relation to those of the corresponding pixels of FIG. 2, have been influenced by noise and correspond not only to the brightness of points of the scene scanned by system 10, but also correspond to noise present in the scene and occurring in this system.

Immediately to the right of matrix 35 in FIG. 3 is a column 38 whose components are row or vector median values, each value being the median of all of the pixel values of the horizontally corresponding row or line of matrix 35. Each such median value is thus the median of a plurality of elements of matrix 35 extending parallel to one of the rows thereof and is the median of predetermined components of the corresponding row or vector. Immediately to the right of column 38 is a column 39 having a component corresponding to each row of matrix 35 and to each median value in column 38. The value of each component in column 39 is the median of the corresponding component of column 38 and of components in column 38 above such corresponding component, the higher median value from column 38 being used arbitrarily when the median of an even number of components therein is being determined and the central components of such even number thereof differ. It is evident that each component of column 38 is a vector median value derived, except for the uppermost component column 38, from the values of elements of matrix 35 disposed in a plurality of contiguous rows thereof and is the median of the vector median of the corresponding row of matrix 35 and of one or more other rows thereof contiguously related to such corresponding row at one side thereof. It is believed that one skilled in the art of digital image preprocessing, given a matrix such as matrix 35, can, in any suitable manner appropriate to a specific processor 25, derive from row median values, such as those in column 38, successive medians such as those in column 39, of the medians of contiguous rows.

Column 38 has two components 40 which are significantly higher in value than the other components thereof and which correspond to two rows 41 of the matrix of FIG. 2 in which pixels corresponding to image 30 are a majority. However, the components 42 in column 39 of FIG. 3, which correspond to components 40, are not significantly different from the other components of column 39.

FIG. 4 is a matrix which corresponds to matrix 35 of FIG. 3 and in which the value of each one of the pixels of matrix 35 has been replaced by the value resulting from a predetermined transform of the values of pixels in a predetermined neighborhood of pixels corresponding to the one pixel and having a predetermined arrangement centered thereon. Any suitable transform or such arrangement may be used with image preprocessing in accordance with the subject invention depending on the nature of noise present in the image from a scanner, such as scanner 15, and the configuration of a target object, such as object 11. However, a well known spatial filtration technique, in which the median of pixels disposed in a cross is substituted for the value of the central pixel thereof, has been found effective when used with the subject invention. For example, the median of the value of a five pixel cross 45 in matrix 35 of FIG. 3 has been utilized as the value of pixel 47 in FIG. 4. The values of the elements of the matrix in FIG. 4 were obtained by calculating the median value of the pixel of such a five pixel cross centered on each pixel of matrix 35 and substituting the resulting neighborhood median pixel value for the value of the pixel, the values used for cross portions extending from the matrix edge being arbitrarily set equal to the value of the center pixel of the cross. While the vicinity of the image corresponding to ideal image 30 of FIG. 2 is generally apparent in FIG. 4, the edges of the image are ill-defined.

FIG. 5 is a matrix corresponding to that of FIG. 4 but having elements whose values were determined, in accordance with the subject invention, by subtracting such vector median value taken from column 38, FIG. 3, from the values of all of the elements of the corresponding row in the matrix of FIG. 4. The difference resulting from each such subtraction was then substituted as the value of the corresponding element in FIG. 5 unless the difference was negative, in which case a zero value was substituted in FIG. 5 for the value of the element. Each row median value from column 38 is thus subtracted from the value of each pixel resulting from the cross median transform and is the median of the values of the pixels of line containing the pixel. It is evident that, when the value of the pixel is below the predetermined minimum value of zero, the value of the pixel is set to this minimum value which represents a predetermined minimum brightness of the points of the scene imaged by system 10. When the matrix of FIG. 5 is compared with that of FIG. 4, it is seen that the image portion 50 in FIG. 5 is substantially that of the corresponding portion of image 30 in FIG. 2, image portion 50 being that in which the pixels of image 30 do not occupy more than a majority of each matrix row. The low and the high frequency noise in FIG. 3 have thus been minimized by the median filtration of the subject invention.

However, in FIG. 5 the object 11 image portion, which corresponds to the portion of image 30 in FIG. 2 in which a majority of the pixels in each matrix row are occupied by the image pixels, has been suppressed. The occurrence of this undesirable effect can be predicted by examination of the row medians in column 38 of FIG. 3 to determine that there is a significant difference between the median of one row 55 and the median of the adjacent row 56 at one side of the row 55. This effect can then be prevented by subtracting from each pixel value of a row of the matrix of FIG. 4 the component of column 39 corresponding to the row, this component being calculated as before stated so that the component is the median of the pixel values of a plurality of adjacent such lines at said one side. FIG. 6 is a matrix whose values are obtained by subtracting from the elements of the rows of the matrix of FIG. 4 the value of the components in column 39 corresponding individually to these rows so that the resulting image 60 in FIG. 6 is substantially the idealized image 30 in FIG. 2.

Any suitable program appropriate for a processor such as processor 25, may be used to subtract the median values of elements of the rows of a matrix, corresponding to matrix 35 or the matrix of FIG. 4, to obtain a matrix corresponding to that of FIG. 5, and it is believed that such a program would be readily apparent to one skilled in the art of digital image preprocessing. It is believed equally apparent to one so skilled to provide such a program which substitutes predetermined minimum values when required as described above and which, upon detecting a significant change between the medians of two adjacent rows, utilizes, as previously set forth, medians of successive row medians instead of the row medians themselves.

Obviously many modifications and variations of the present invention are possible in light of the above teachings. It is, therefore, to be understood that the invention may be practiced within the scope of the following claims other than as specifically described.

What is claimed is:

1. In a system providing an image represented digitally as a plurality of parallel vectors and in which components of the vectors have values corresponding to the brightness of points of a scene and to noise present therein or occurring in the system, the method of median filtration comprising:

calculating for each vector of said plurality a vector median value which is the median of the values of predetermined components of the vector; and when there is a significant difference between the vector median value of one vector of said plurality and the vector median value of the vector of said plurality adjacent to said one vector at one side thereof, subtracting from one component of said one vector the median of the vector median values of said one vector and one or more other vectors included in said plurality and contiguously related to said one vector at said one side thereof.

2. The method of claim 1 further comprising setting the value of said one component to a predetermined value when the value of said one component, after subtracting said median, is less than a value corresponding to a predetermined such brightness.

* * * * *